United States Patent [19]
Flynn

[11] Patent Number: 5,159,527
[45] Date of Patent: Oct. 27, 1992

[54] DIELECTRIC LIQUIDS

[75] Inventor: Richard M. Flynn, Mahtomedi, Minn.

[73] Assignee: Minnesota Mining and Manufacturing Company, St. Paul, Minn.

[21] Appl. No.: 803,176

[22] Filed: Dec. 5, 1991

[51] Int. Cl.$^5$ .......................... H01G 4/22; H01B 3/24
[52] U.S. Cl. .................................... 361/317; 252/579
[58] Field of Search ............... 361/314, 315, 317, 318, 361/319, 327, 503, 504, 507; 252/63.2, 579

[56] References Cited

U.S. PATENT DOCUMENTS

| | | | |
|---|---|---|---|
| 2,623,096 | 12/1952 | Robinson | 175/41 |
| 2,886,265 | 5/1959 | Wolfe | 174/15 |
| 3,184,533 | 5/1965 | Eiseman, Jr. | 174/17 |
| 3,346,612 | 10/1967 | Hansen | 260/456 |
| 3,708,537 | 1/1973 | Groves | 260/556 F |
| 3,786,324 | 1/1974 | Kotschy | 361/318 |
| 4,482,478 | 11/1984 | Shaw | 252/579 |
| 4,899,249 | 2/1990 | Reilly et al. | 361/317 |

FOREIGN PATENT DOCUMENTS 1242180 8/1971 United Kingdom .

OTHER PUBLICATIONS

Wilson, "Insulating Liquids: Their Uses, Manufacture and Properties", p. 6, Peter Peregrinus Ltd., 1980.
3M Product Information Bulletin *Fluorinert TM Liquids*, 98-0211-5347-7(101.5)NPI(Jan. 1990).

*Primary Examiner*—Donald Griffin
*Attorney, Agent, or Firm*—Gary L. Griswold; Walter N. Kirn; Carolyn V. Peters

[57] ABSTRACT

A dielectric liquid is provided comprising (a) a fluorinated, inert liquid, or a mixture of fluorinated, inert liquids and (b) a fluorine-containing, nonionic sulfonate ester or sulfonamide, such that the dielectric liquid has a dielectric constant intermediate or between that of component (a) and component (b) and the dielectric constant represents the relative amounts of the relatively lower dielectric constant of the fluorinated, inert liquid per se and the relatively higher dielectric constant of the sulfonate ester or sulfonamide per se and components (a) and (b) of the dielectric liquid are miscible with one another over the operating temperature range of the electrical device employing the dielectric liquid.

20 Claims, No Drawings

DIELECTRIC LIQUIDS

This invention relates to a fluorinated dielectric liquid and the use thereof in electrical devices such as capacitors.

Dielectric fluids (gases or liquids) are used in various electrical apparatus, see for example U.S. Pat. No. 3,184,533 (Eiseman Jr.). Major types of such apparatus are transformers, vaporization-cooled transformers, gas-filled electric cables, and circuit breakers. Dielectric fluids are also used in capacitors provided their dielectric constants and power factors are satisfactory for such application.

In electrical devices such as capacitors, dielectric liquids are often used in place of air due to their high dielectric constant (K) and high dielectric strength (DS). Some capacitors of this type comprise alternate layers of metal foil conductors and solid dielectric sheets of paper or polymer film. Other capacitors are constructed by wrapping the metal foil conductor(s) and dielectric film(s) concentrically around a central core. This latter type of capacitor is referred to as a "film-wound" capacitor. Dielectric liquids are often used to impregnate dielectric film due to their high dielectric constant and high dielectric strength. Such dielectric liquids allow more energy to be stored within the capacitor (higher capacitance) as compared to air- or other gas-filled electrical devices.

In liquid-filled capacitors, it is advantageous to match the dielectric constant of the dielectric liquid with that of the dielectric film, that is, the dielectric constants of the two components should be approximately the same. In devices such as film-wound capacitors, the dielectric constant ($K_{total}$) of the device is a function of the following equation, wherein ($d_{total}$) represents the total thickness of the dielectric film(s) and of the dielectric liquid layer(s).

$$d_{total}/K_{total} = d_{film}/K_{film} + d_{fluid}/K_{fluid}.$$

In view of the above equation, the dielectric constant of the device ($K_{total}$) is approximately that of the component having the lowest dielectric constant. For example, if the dielectric constant of the dielectric fluid is much lower than that of the dielectric film, the dielectric constant of the device is approximately that of the dielectric fluid. When the dielectric constant of the device is approximately that of the dielectric film, film breakdown and catastrophic failure of the capacitor can occur. Thus, it is desirable for the dielectric constant of the film and fluid to match, that is, be the same or be approximately the same.

Conventional dielectric liquids such as petroleum mineral oils have found wide application due to their low cost and ready availability. However, their use has been limited in many electrical devices because of their relative low chemical stability and their flammability. Chlorinated aromatic hydrocarbons, for example, polychlorinated biphenyls (PCBs), were developed as fire-resistant insulating liquids, have excellent chemical stability, and have a much higher dielectric constant that the mineral oils. Unfortunately, certain PCB isomers have a high resistance to biological degradation and problems of toxicity are now being encountered due to PCB spillage and leakage. A. C. M. Wilson, *Insulating Liquids: Their Uses, Manufacture and Properties* 6 (Peter Peregrinus Ltd 1980), notes the use of PCBs are likely to be phased out as other more environmentally safe liquids become available.

Perfluorinated compounds that have been used as dielectric fluids, include perfluorinated unsaturated ring compounds, fluoroethers (alkyl, alkylene and aryl), fluoroamines, and fluoroesters as noted in Wilson, supra. However, as noted in U.S. Pat. No. 2,623,096 (Robinson), although the "dielectric properties are often satisfactory," flurocarbons "do not wet surfaces in the manner of polar material. As a result, the film forming maintaining properties are poor. In electrical capacitors, bubbles of air, voids and the like are not readily replaced or filled by the fluorocarbons. Undesirable voltage gradients and electrical breakdowns may therefore occur."

U.S. Pat. No. 4,899,249 (Reilly et al.) describes the use of fluorinated carboxamides and sulfonamides as dielectric media. The media have high dielectric constants and low surface tensions, the latter being necessary to wet parts of the capacitor winding. The dielectric constants are reported in the range from about 18 to about 100 at 100 Khz. The dielectric media may be used "in combination with other conventional dielectric media, (e.g. dioctyl phthalate)".

U.S. Pat. No. 3,786,324 (Kotschy) describes a "regenerative-type" capacitor with decreased flammability. The dielectric fluid employed comprises a homogeneous mixture of a hydrocarbon liquid and a relatively small amount of a perfluorinated fluorocarbon liquid mixture. The hydrocarbon liquids include mineral oil, dodecyl benzene, dioctylsebacate and the like. The liquid fluorocarbon mixture comprises at least one of trifluoromethyl perfluorohydrooxazine and perfluorinated dimethylcyclohexane, and at least one of a perfluoroalkylpolyether and trifluoromethyl perfluorodecalin. The weight range of the fluorocarbon mixture to the hydrocarbon mixture is from (0.00025 to 0.1):1. The effect of the fluorocarbon mixture is to improve combustion protection.

UK Patent No. 1 242 180 (Siemens) describes a process for the manufacture of an impregnated electrical capacitor, the impregnating material comprising mineral oil, silicone oil, a fluorinated hydrocarbon, or a pure hydrocarbon. Fluorinated hydrocarbons, both perfluorinated and partially fluorinated, are advantageous since they form no corrosive by-products and are capable of swelling synthetic materials.

Briefly, in one aspect of the present invention, a dielectric liquid is provided comprising (a) a fluorinated, inert liquid or a mixture of fluorinated, inert liquids and (b) a fluorine-containing, nonionic sulfonate ester or sulfonamide. The dielectric liquid has a dielectric constant intermediate or between that of component (a) and component (b) and the dielectric constant represents the relative amounts of the relatively lower dielectric constant of the fluorinated, inert liquid per se and the relatively higher dielectric constant of the fluorine-containing, nonionic sulfonate ester or sulfonamide per se. Components (a) and (b) of the dielectric liquid are miscible with one another over the operating temperature range of the electrical device employing the dielectric liquid. Furthermore, although the miscibility of the two components need only be in the useful range of ratios of the two components, it is preferred the two components be miscible over the full range of ratios of the two components. Components (a) and (b) may be blended or mixed together to produce a dielectric liquid having controllable electrical properties, such as dielectric constants. The dielectric liquid of this invention may be prepared having a predetermined dielectric constant of intermediate value as compared to either component (a) or (b). The dielectric liquid retains many of the advantageous physical properties of the fluorinated, inert liquid, including stability, vapor pressure, low-flammability, non-explosive, and low surface tension, as well as improved electrical properties, including a desired, predetermined dielectric constant, a high dielectric strength, and low loss or dissipation factor.

In another aspect of the present invention, an electrical device is provided comprising, as the insulating material, the dielectric liquid of the present invention. The dielectric liquids of the present invention may be useful in a number of other applications that use dielectric liquids. Examples of such other applications are described in U.S. Pat. Nos. 4,899,249 (Reilly et al.); 3,184,533 (Eiseman Jr.); UK Patent No. 1 242 180 (Siemens) and such descriptions are incorporated herein by reference.

The dielectric liquid of the present invention can be matched to a dielectric film, even if an appropriate dielectric liquid is not commerically available. The desired dielectric fluid may be prepared without a great deal of trial and error. Furthermore, such a dielectric liquid displays other desirable properties such as flammability, dielectric strength, chemical stability, or surface tension.

It would be therefore advantageous to prepare a dielectric liquid having a predetermined dielectric constant, that also had the desired physical properties such as boiling point and chemical stability, and electrical properties such as high dielectric strength and low loss. It would further be advantageous to have a dielectric liquid whose dielectric constant could be tailored to match a that of the dielectric film in an electrical device such as a capacitor.

Advantageously, the dielectric liquids of the present have a high electrical strength, also described as high breakdown voltage. "Breakdown voltage," as used in this application means (at a specific frequency) the highest voltage applied to a liquid that induces catastrophic failure of the dielectric liquid. Thus the dielectric liquids of the present invention can function under high voltages. The dielectric liquids of the present invention can also exhibit a low loss factor, that is, the amount of electrical energy that is lost as heat from an electrical device such as a capacitor.

It has been found that the components (a) and (b) may be blended together to form a dielectric liquid in which the resultant dielectric constant of the liquid is directly related to the weight percent of component (a) or conversely component (b). Thus, one may produce a dielectric liquid having a predetermined dielectric constant by varying the proportions of the two components. The dielectric constant of the liquid ($K_{liquid}$) has been found to vary according to the weight percent of component (a), according to the formula:

$$K_{total} = \frac{\text{component }(a)\text{ (wt. \%)} - B}{r} \quad (III)$$

such that when Equation III is plotted, a line is produced having B as the intercept of the line and r is the slope of the line and in which $K_{(total)}$ has been experimentally determined by measuring the dielectric constant of various wt. % ratios of the two components. By using Equation III with the experimentally determined values of B and r, the wt % of component (a) necessary to obtain a dielectric liquid having a pre-determined dielectric constant can be determined.

The fluorinated, inert liquids (component (a) can be one or a mixture of fluoroaliphatic compounds having 5 to 18 carbon atoms or more, optionally, containing one or more catenary heteroatoms, such as divalent oxygen, hexavalent sulfur, or trivalent nitrogen and having a hydrogen content of less than 5% by weight, preferably less than 1% by weight.

Suitable fluorinated, inert liquids useful in this invention include, for example, perfluoroalkanes or perfluorocycloalkanes, such as, perfluoropentane, perfluorohexane, perfluoroheptane, perfluorooctane, perfluoro-1, 2-bis(trifluoromethyl)hexafluorocyclobutane, perfluorotetradecahydrophenanthrene, and perfluorodecalin; perfluoroamines, such as, perfluorotributyl amine, perfluorotriethyl amine, perfluorotriisopropyl amine, perfluorotriamyl amine, perfluoro-N-methyl morpholine, perfluoro-N-ethyl morpholine, and perfluoro-N-isopropyl morpholine; perfluoroethers, such as perfluorobutyl tetrahydrofuran, perfluorodibutyl ether, perfluorobutoxyethoxy formal, perfluorohexyl formal, and perfluorooctyl formal; perfluoropolyethers; hydrofluorocarbons, such as pentadecafluorohydroheptane, 1,1,2,2-tetrafluorocyclobutane, 1-trifluoromethyl-1,2,2-trifluorocyclobutane, 2-hydro-3-oxaheptadecafluorooctane. The prefix "perfluoro-" as used in this application means that all, or essentially all, of the hydrogens atoms are replaced by fluorine atoms.

Commercially available fluorinated, inert liquids useful in this invention include FC-40, FC-72, FC-75, FC-5311, FC-5312 (available from 3M Company under the tradename designation of "Fluorinert," 3M Product Bulletin 98-0211-5347-7(101.5)NP1 (1990)); LS-190, LS-215, LS-260 (available from Montefluos Inc., Italy); HT-85, HT-70, HT-135, HT-250 (available from Montefluos Inc., Italy, under the tradename designation of "Galden"); Hostinert ™ 175, 216, 272 (available from Hoechst-Celanese, under the tradename designation of "Hostinert"); and K-6, K-7, K-8 (available from DuPont).

The fluorinated, inert liquids useful in the present invention have a liquid range that encompasses the operating temperature range of the electrical device in which they are used as components of the dielectric liquid of this invention, such that the preferably the fluorinated, inert liquids have a boiling range above 50° C. Typically, the fluorinated, inert liquids have a boiling range of about 120° C. to 260° C. or higher.

A first class of fluorine-containing, nonionic compounds useful as component (b) in the dielectric liquid of this invention are fluorinated sulfonate esters that are normally liquid or normally solid, and preferably have a boiling point in the range of 120° C. to 260° C. or higher. The fluorine-containing, nonionic sulfonate esters have a dielectric constant greater than the fluorinated, inert liquid (component (a)) and are sufficiently miscible at the operating temperature of the electrical device. Preferably, the dielectric constant of the fluorine-containing, nonionic sulfonate esters is greater than 3. The first class can be represented by the general formula:

$$R_f\text{—}SO_2\text{—}OR \quad (I)$$

wherein $R_f$ is a monovalent perfluoroaliphatic group having 1 to 12 fluorinated carbon atoms, preferably fully fluorinated but hydrogen or chlorine atoms may be present as substitutents provided that not more than one atom of either is present for every two carbon atom, optionally, containing one or more catenary heteroatoms, such as divalent oxygen, hexavalent sulfur, or trivalent nitrogen bonded only to carbon atoms, such heteroatoms being a chemically stable link between fluorocarbon portions of the perfluoroaliphatic group and do not interfere with the inert character of the perfluoroaliphatic group; the skeletal chain of $R_f$ can be straight chain, branched chain, and if sufficiently large, cyclic, or combinations thereof, such as alkylcycloaliphatic radical; and R is an aryl or arylene group or a group derived from dihydroalcohols, such as a —CH$_2$R$_f$ group, such that R$_f$ is as described above and R, preferably has 6 to 12 carbon atoms, optionally, R may be substituted with a lower alkyl, alkoxy or aryloxy group, for example having 1 to 8 carbon atoms or a halogen atom.

A second class of fluorine-containing, nonionic compounds useful as component (b) in the dielectric liquid of this invention are fluorinated aliphatic sulfonamides that are normally liquid or normally solid, and preferably have a boiling point in the range of 120° C. to 260° C. or higher. The fluorine-containing, nonionic sulfonamides have a dielectric constant greater than the fluorinated inert liquid (component (a) and are sufficiently miscible at the operating temperature of the electrical device, preferably, the dielectric constant of the fluorine-containing, nonionic sulfonamides is greater than 3. The second class can be generally represented by the following formula:

$$R_f-SO_2-NR^1R^2 \qquad (II)$$

wherein $R_f$ is a monovalent perfluoroaliphatic group having 1 to 12 fluorinated carbon atoms, preferably fully fluorinated but hydrogen or chlorine atoms may be present as subsitutents provided that not more than one atom of either is present for every two carbon atom, optionally, containing one or more catenary heteroatoms, such as divalent oxygen, hexavalent sulfur, or trivalent nitrogen bonded only to carbon atoms, such heteroatoms being a chemically stable link between fluorocarbon portions of the perfluoroaliphatic group and do not interfere with the inert character of the perfluoroaliphatic group; the skeletal chain of $R_f$ can be straight chain, branched chain, and if sufficiently large, cyclic, or combinations thereof, such as alkylcycloaliphatic radical;

$R^1$ and $R^2$ are independently hydrogen atoms, or aliphatic groups preferably containing 1 to 8 carbon atoms, more preferably 1 to 4 carbon atoms, $R^1$ and $R^2$ may be the same or different provided that $R^1$ and $R^2$ are not both hydrogen atoms.

Suitable fluorine-containing, nonionic sulfonate esters or sulfonamides that can be used in the dielectric liquids of the present invention and represented by formulas I and II include, for example 3-methyl phenylnonafluorobutanesulfonate, 3-methyl phenylheptadecafluorooctanesulfonate, 2-chlorophenylnonafluorobutanesulfonate, 3-chlorophenyl nonafluorobutanesulfonate, N-ethyl-N-allyl heptadecafluorooctanesulfonamide, N,N-diethyl nonafluorobutanesulfonamide, N,N-diethylpentafluorosulfanyloctafluorobutane sulfonamide, N,N-diethylnonafluorohexyl sulfonamide, and undecafluorocyclohexylmethyl nonafluorobutanesulfonate.

Fluorine-containing, nonionic sulfonate esters or sulfonamides that can be described with Formulas I-II are known in the literature or are commercially available. Sulfonamides may be prepared as described in U.S. Pat. No. 3,708,537 (Groves) and such description is herein incorporated by reference. Sulfonate esters may be prepared as described in U.S. Pat. No. 3,346,612 (Hansen) and such description is herein incorporated by reference.

By varying the composition of the liquid from greater than 0% by wt. to less than 100% by wt. of component (a), preferably 5% by wt. to 95% by wt. of component (a), dielectric liquids having a range of dielectric constant may be obtained. It is preferable that components (a) and (b) be miscible with one another over a broad range of operating temperatures, and more preferably that the two components be completely miscible with one another in all proportions so that the dielectric constant may be varied from greater than 0% to less than 100% wt. by wt. of component (b) preferably 95% by wt. to 5% by wt. of component (b). However, it is only necessary than the two components be miscible with one another over the range that provides the desired dielectric constant at an operating temperature of the electrical device in which the dielectric liquid is used.

When employed as a dielectric liquid in electrical devices, it is preferable the dielectric liquid remains homogeneous, and has a constant composition over the working temperature of the device. If the boiling point of one component of the mixture were much lower than the other component, the concentration of the lower boiling component would be reduced in the dielectric liquid, since the lower boiling component would be selectively vaporized. This change in composition would tend to alter the physical and electrical properties of the dielectric liquid, such as the dielectric constant, such that the dielectric constant of the liquid would approach the dielectric constant of the higher boiling component. As a result, it is preferable that the fluorinated, inert liquid and the fluorine-containing, nonionic sulfonate esters or sulfonamides have similar boiling points.

The boiling point of the two components is also of significant interest in the manufacturing process of capacitors. During the winding process of making a film-wound capacitor, the fluid may be subjected to temperature extremes ranging from 30° C. to 120° C. Volatilization of the fluid during the winding process could lead to voids between the film layers, which can lead to catastrophic failure of the electrical device.

Objects and advantages of this invention are further illustrated by the following examples, but the particular materials and amounts thereof recited in these examples, as well as other conditions and details, should not be construed to unduly limit this invention.

EXAMPLES

In the Examples, a fluorinated, inert liquid was mixed with a fluorine-containing, nonionic sulfonate ester or sulfonamide in the proportions shown, and the electrical properties were measured using the following ASTM test methods. The dielectric strength was evaluated using 0.25 cm gap and the breakdown (DS) of the dielectric liquids is measured in kilovolts (kV)

| Fluid Property | ASTM Test Method |
| --- | --- |
| Dielectric Constant (K) | D924-82b |
| Dissipation Factor (DF) | D924-82b |
| Volume Resistivity (VR) (ohm.cm) | D1169-89 |
| Dielectric Strength (DS) (kV) | D149-87 (Solids) D877-87 (Liquids) |

EXAMPLES 1-9

Perfluorotributylamine (component (a)) and N,N-diethyl nonafluorobutanesulfonamide (component (b)) were found to be miscible with one another in essentially all proportions at 25° C. The dielectric constant of perfluorotributylamine was 1.9 and the sulfonamide was 19.1. Dielectric liquids are summarized in Table 1 and the electrical properties of the various liquids were measured according the test methods described above. The flash points of the liquids were generally above 90°

Table 2 shows that perfluorinated liquids other than perfluorotributylamine (FC-40) may be used to prepared dielectric liquids having varying values of K. These perfluorinated liquids include a perfluoroalkane, a perfluoropolyether, a perfluoroether, and a perfluorocycloalkane.

Examples 14-16

Examples 14-16 illustrate the use of several different fluorinated inert liquids and several fluorine-containing sulfonate esters or sulfonamides. The examples are summarized in Table 3a and the electrical properties are summarized in Table 3b. Table 3 shows that various fluorine-containing, nonionic sulfonamides and sulfonate esters may be used in combination with various fluorinated, inert liquids.

Various modifications and alterations of this invention will become apparent to those skilled in the art without departing from the scope and principles of this invention, and it should be understood that this invention is not to be unduly limited to the illustrative embodiments set forth hereinabove.

TABLE 1

| Example | (a)/(b) (% by wt.) | K | DS (kV) | VR (ohm.cm) | Dissipation Factor (DF) (tan Δ) | | | |
| --- | --- | --- | --- | --- | --- | --- | --- | --- |
| | | | | | 1 kHz | 10 kHz | 100 kHz | 1 MHz |
| 1 | 100/0 | 1.9 | 46 | 4.0E15 | <0.0003 | <0.0003 | <0.0003 | <0.0003 |
| 2 | 84/16 | 3.9 | 33 | 2.7E9 | 0.217 | 0.021 | 0.001 | 0.0008 |
| 3 | 80/20 | 4.5 | 29 | 2.0E10 | 0.033 | 0.0036 | <0.0001 | 0.0009 |
| 4 | 70/30 | 6.2 | 28 | 3.3E9 | 0.114 | 0.0112 | 0.0002 | 0.0013 |
| 5 | 60/40 | 8.3 | 28 | 1.5E9 | 0.161 | 0.0161 | 0.0009 | 0.0009 |
| 6 | 40/60 | 11.5 | 23 | 5.6E8 | — | 0.102 | 0.0103 | 0.0017 |
| 7 | 30/70 | 13.2 | 21 | 5.5E7 | — | 0.141 | 0.0140 | 0.0008 |
| 8 | 20/80 | 15.2 | 20 | 4.7E8 | — | 0.175 | 0.0171 | 0.0024 |
| 9 | 0/100 | 19.1 | 23 | 4.2E8 | 0.710 | 0.08 | 0.01 | 0.02 |

TABLE 2

| Example | Component (a) ((a)/(b) % by wt.) | K | DS (kV) | VR (ohm.cm) | Dissipation Factor (DF) (tan Δ) | | | |
| --- | --- | --- | --- | --- | --- | --- | --- | --- |
| | | | | | 1 kHz | 10 kHz | 100 kHz | 1 MHz |
| 10 | FC-72* (75/25) | 5.0 | 23 | 3.7E10 | 0.157 | 0.0159 | 0.0015 | <0.0001 |
| 11 | LS-190 † (70/30) | 5.8 | 27 | 5.4E8 | 0.266 | 0.0267 | 0.0026 | 0.0002 |
| 12 | FC-75* (65/35) | 6.8 | 21 | 3.4E9 | 0.402 | 0.0404 | 0.0037 | <0.0001 |
| 13 | FC-5311* (50/50) | 10.1 | 25 | 2.2E9 | 0.672 | 0.0676 | 0.0069 | 0.0005 |

* available from 3M Co. (St. Paul, Minnesota)
† available from Montefluos Inc. (Italy)

C. Table 1 shows that a range of dielectric constants may be obtained by combining a fluorinated, inert liquid with a fluorine-containing, nonionic sulfonamide. By application of Equation III, the plotted straight line obtained may be used to determine the (a)/(b) ratio necessary to obtain a desired K value between 1.9 and 19.1.

Examples 10-13

Examples 10-13 were prepared using various fluorinated inert liquids as component (a) and N,N-diethyl nonafluorobutanesulfonamide as component (b). The various dielectric liquids and electrical properties of the various dielectric liquids are summarized in Table 2.

TABLE 3a

| Example | Component (a) (% by wt.) | Component (b) (% by wt.) | K of Component (b) |
| --- | --- | --- | --- |
| 14 | perfluorotributylamine (67.5) | nonafluorobutanesulfonate ester of m-cresol (32.5) | 9.0 |
| 15 | perfluorotributylamine (33.0) | nonafluorobutanesulfonate ester of o-chlorophenol (67.0) | 11.6 |
| 16 | 1-hydropentadecafluoroheptane (50.1) | N,N-diethylnonafluorobutanesulfonamide (49.9) | — |

TABLE 3b

| Example | K | VR (ohm-cm) | DS (kV) | Dissipation Factor (tan Δ) | | | | |
| --- | --- | --- | --- | --- | --- | --- | --- | --- |
| | | | | 100 Hz | 1 kHz | 10 kHz | 100 kHz | 1 MHz |
| 14 | 4.0 | 9.3E9 | 12.7 | 0.49 | 0.05 | 0.0049 | 0.0006 | <0.0006 |
| 15 | 4.44 | 9.6E10 | 17.1 | 0.062 | 0.0063 | 0.0006 | 0.0005 | 0.00043 |

TABLE 3b-continued

| Example | K | VR (ohm-cm) | DS (kV) | Dissipation Factor (tan Δ) | | | | |
|---|---|---|---|---|---|---|---|---|
| | | | | 100 Hz | 1 kHz | 10 kHz | 100 kHz | 1 MHz |
| 16 | 10.97 | 5.7E8 | 10.8 | too lossy | 0.52 | 0.053 | 0.0053 | 0.0012 |

I claim:

1. A dielectric liquid comprising a homogeneous mixture of (a) a fluorinated, inert liquid or a mixture of fluorinated, inert liquids, and (b) a fluorine-containing, nonionic sulfonate ester or sulfonamide.

2. The dielectric liquid according to claim 1, wherein the fluorine-containing, nonionic sulfonate ester has the general formula:

$$R_f\text{—}SO_2\text{—}OR \qquad (I)$$

wherein
$R_f$ is a monovalent perfluoroaliphatic group having 1 to 12 fully fluorinated carbon atoms, the skeletal chain of $R_f$ can be straight chain, branched chain, and if sufficiently large, cyclic, or combinations thereof;
R is an aryl or arylene group or a group derived from dihydroalcohols, such as a —CH$_2$R$_f$ group, such that $R_f$ is as described above and R has 6 to 12 carbon atoms.

3. The dielectric liquid according to claim 1, wherein the fluorine-containing, nonionic aliphatic sulfonamide has the general formula:

$$R_f\text{—}SO_2\text{—}NR^1R^2 \qquad (II)$$

wherein
$R_f$ is a monovalent perfluoroaliphatic group having 1 to 12 fully fluorinated carbon atoms, the skeletal chain of $R_f$ can be straight chain, branched chain, and if sufficiently large, cyclic, or combinations thereof;
$R^1$ and $R^2$ are independently hydrogen atoms, or aliphatic groups containing 1 to 8 carbon atoms, $R^1$ and $R^2$ may be the same or different provided that $R^1$ and $R^2$ are not both hydrogen atoms.

4. The dielectric liquid according to claim 1, wherein the ratio of fluorinated, inert liquid to fluorine-containing, nonionic sulfonate ester or sulfonamide is such that the dielectric liquid has a dielectric constant between that of the fluorinated, inert liquid and the fluorine-containing, nonionic sulfonate ester or sulfonamide, and such dielectric constant represents the relative amounts of the relatively lower dielectric constant of the fluorinated, inert liquid and the relatively higher dielectric constant of the fluorine-containing, nonionic sulfonate ester or sulfonamide.

5. The dielectric liquid according to claim 4, wherein the ratio of fluorinated, inert liquid to fluorine-containing, nonionic sulfonate ester or sulfonamide is 5:95% by wt. to 95:5% by wt.

6. The dielectric liquid according to claim 5, wherein the dielectric constant is greater than 2.0.

7. The dielectric liquid according to claim 1, wherein the dielectric liquid comprises a homogenous mixture of perfluoropolyether and N,N-diethylnonafluorobutanesulfonamide.

8. The dielectric liquid according to claim 1, wherein the dielectric liquid comprises a homogenous mixture of perfluorotetradecahydrophenanthrene and N,N-diethylnonafluorobutanesulfonamide.

9. The dielectric liquid according to claim 1, wherein the dielectric liquid comprises a homogenous mixture of perfluorotributylamine and N,N-diethylnonafluorobutanesulfonamide.

10. The dielectric liquid according to claim 1, wherein the dielectric liquid comprises a homogenous mixture of perfluorotributylamine and nonafluorobutanesulfonate ester of m-cresol.

11. The dielectric liquid according to claim 1, wherein the dielectric liquid comprises a homogenous mixture of 1-hydropentadecafluoroheptane and N,N-diethylnonafluorobutanesulfonamide.

12. The dielectric liquid according to claim 1, wherein the dielectric liquid comprises a homogenous mixture of perfluorotributylamine and nonafluorobutanesulfonate ester of o-chlorophenol.

13. The dielectric liquid according to claim 1, wherein the dielectric liquid comprises a homogeneous mixture of perfluorotriamylamine and N,N-diethylnonafluorobutanesulfonamide.

14. The dielectric liquid according to claim 1, wherein the dielectric liquid comprises a homogeneous mixture of perfluorotriamylamine and nonafluorobutanesulfonate ester of m-cresol.

15. The dielectric liquid according to claim 1, wherein the dielectric liquid comprises a homogeneous mixture of perfluorocyclohexylmethyldecahydronaphthalene and N,N-diethylnonafluorobutanesulfonamide.

16. The dielectric liquid according to claim 1, wherein the dielectric liquid comprises a homogeneous mixture of perfluorobutoxyethoxy formal and N,N-diethylnonafluorobutanesulfonamide.

17. The dielectric liquid according to claim 1, wherein the dielectric liquid comprises a homogeneous mixture of perfluorobutoxyethoxy formal and nonafluorobutanesulfonate ester of m-cresol.

18. An electrical device containing as a component a dielectric liquid comprising a homogeneous mixture of (a) a fluorinated, inert liquid, or a mixture of such fluorinated, inert liquids, and (b) a fluorine-containing, nonionic sulfonate ester or sulfonamide, wherein the dielectric liquid has a boiling point above the operating temperature of the electrical device.

19. The electrical device according to claim 18, wherein the electrical device is an electrical capacitor comprising metal electrodes spaced from each other, and such that the dielectric fluid fills the space between the electrodes.

20. The electrical device according to claim 19, further comprising a capacitor comprising dielectric solid sheets impregnated with the dielectric liquid.

* * * * *

UNITED STATES PATENT AND TRADEMARK OFFICE
CERTIFICATE OF CORRECTION

PATENT NO. : 5,159,527
DATED : October 27, 1992
INVENTOR(S) : Flynn

It is certified that error appears in the above-identified patent and that said Letters Patent is hereby corrected as shown below:

Col. 1, line 62, Replace "that" with --than--

Col. 3, line 35, Delete --a-- after "match"

Col. 4, line 3, Insert -- ) -- after "(component (a)"

Col. 4, line 47, Delete --the-- after "that"

Col. 5, line 30, Insert -- ) -- after "(component (a)"

Col. 6, line 26, Replace "than" with --that--

Col. 7, line 21, Insert --to-- after "according"

Col. 8, line 2 & 3, Replace "prepared" with --prepare--

Signed and Sealed this

Second Day of November, 1993

*Attest:*

BRUCE LEHMAN

*Attesting Officer*  Commissioner of Patents and Trademarks